United States Patent
Jaudouin et al.

(10) Patent No.: US 8,668,269 B2
(45) Date of Patent: Mar. 11, 2014

(54) ARTICULATION SYSTEM AND VEHICLE SEAT COMPRISING SUCH AN ARTICULATION SYSTEM

(75) Inventors: Paul Jaudouin, St Georges des Groseilliers (FR); Yann Reubeuze, Landigou (FR)

(73) Assignee: Faurecia Sièges d'Automobile, Nanterre (FR)

( * ) Notice: Subject to any disclaimer, the term of this patent is extended or adjusted under 35 U.S.C. 154(b) by 17 days.

(21) Appl. No.: 13/414,089

(22) Filed: Mar. 7, 2012

(65) Prior Publication Data
US 2012/0242133 A1    Sep. 27, 2012

(30) Foreign Application Priority Data
Mar. 22, 2011    (FR) ...................................... 11 52378

(51) Int. Cl.
*B60N 2/235*    (2006.01)
(52) U.S. Cl.
USPC .................... 297/367 P; 297/366; 297/367 R
(58) Field of Classification Search
USPC ............. 297/366, 367, 354.12, 367 R, 367 L, 297/367 P
See application file for complete search history.

(56) References Cited

U.S. PATENT DOCUMENTS

| | | | |
|---|---|---|---|
| 5,553,922 A * | 9/1996 | Yamada | 297/362 |
| 6,669,296 B2 * | 12/2003 | Moriyama et al. | 297/367 R |
| 7,222,919 B2 * | 5/2007 | Uramichi et al. | 297/367 R |
| 7,255,398 B2 | 8/2007 | Tokui et al. | |
| 7,490,907 B2 | 2/2009 | Nagura et al. | |
| 8,414,077 B2 * | 4/2013 | Reubeuze et al. | 297/367 P |
| 2002/0185903 A1 * | 12/2002 | Hosokawa | 297/362 |

FOREIGN PATENT DOCUMENTS

| | | |
|---|---|---|
| DE | 1580705 | 12/1970 |
| DE | 7409193 | 10/1974 |
| DE | 19757110 C1 | 11/1998 |
| DE | 19757111 C1 | 11/1998 |
| DE | 19919698 A1 | 11/2000 |
| DE | 20210782 | 10/2002 |
| DE | 10244751 A1 | 5/2003 |
| DE | 10202762 C1 | 6/2003 |
| DE | 102010021902 A1 | 12/2011 |
| EP | 1 652 721 A2 | 3/2006 |
| EP | 1 749 693 A2 | 7/2007 |
| FR | 2 941 180 | 7/2010 |

OTHER PUBLICATIONS

Preliminary Search Report and Written Opinion for related French Application No. FR 09 50343; report dated Sep. 7, 2009.

* cited by examiner

*Primary Examiner* — Sarah B McPartlin
(74) *Attorney, Agent, or Firm* — Miller, Matthias & Hull LLP (57) ABSTRACT

Articulation system comprising first and second articulations, each comprising two fittings which are pivotable relative to one another and a locking mechanism which comprises a control member which is mobile between a locked position and an unlocked position, the control members each being urged in a resilient manner into the locked position by a return member, a maneuvering member which is mobile in rotation between a neutral position, a position of misuse and an actuating position, in order to unlock the control members when said maneuvering member is displaced in a first direction, said maneuvering member being returned from the position of misuse and the actuating position into the neutral position by a dual-action return device.

11 Claims, 6 Drawing Sheets

FIG. 10c

ARTICULATION SYSTEM AND VEHICLE SEAT COMPRISING SUCH AN ARTICULATION SYSTEM

CROSS-REFERENCE TO RELATED APPLICATIONS

This application claims priority under the Paris Convention to French Patent Application No. FR 11 52378, filed on Mar. 22, 2011.

FIELD OF THE DISCLOSURE

The present invention relates to articulation systems for vehicle seats and seats comprising such articulation systems.

BACKGROUND OF THE DISCLOSURE

More particularly, the invention relates to an articulation system comprising:
first and second articulations, each comprising two fittings which are pivotable relative to one another and a locking mechanism which comprises at least one control member which is mobile between a locked position and an unlocked position, the locking mechanism being capable of locking the two fittings when the control member is in the locked position and unlocking the two fittings when the control member is in the unlocked position, the control members of the two articulations each being urged in a resilient manner into the locked position by a return member arranged between the fittings,
a manoeuvring member which is mobile in rotation between a neutral position and an actuating position and capable of displacing the control members of the first and second articulations from the locked position to the unlocked position when said manoeuvring member is displaced in a first direction from the rest position into the actuating position.

The document FR-A-2941180 discloses an example of such a system in which the manoeuvring member comprises a connecting bar which in turn is fixed to the control member of the first articulation and connected with angular clearance to the control member of the second articulation. Said known systems, where one of the articulations is the master and the other the slave, do not permit the locking mechanisms of the two articulations to be completely in the rest position in the absence of the actuation of the manoeuvring member.

More specifically, it may arise that the control member of one of the articulations arrives in the rest position before the other, in which case only one of the articulations is locked, the other articulation remaining unlocked even in the absence of the actuation of the manoeuvring member. Moreover, in the known systems, the manoeuvring member may be damaged in the event of significant force in a direction opposing the actuating direction.

SUMMARY OF THE DISCLOSURE

The object of the present invention, in particular, is to remedy said drawbacks.

To this end, according to the invention, the manoeuvring member is capable of coming to bear against the control members after at least one first predetermined angular path from the neutral position in the first direction, said manoeuvring member being returned to the neutral position by a dual-action return device in a second direction opposing the first direction in at least one of the two articulations.

As a result of these arrangements, the manoeuvring member is able to return to its neutral position independently of the two control members of the articulations. Thus it is guaranteed that the two articulations are correctly locked in the absence of the actuation of the manoeuvring member, whilst permitting the combined unlocking thereof by the actuation of a single manoeuvring member, and without the use of complex or costly means.

Further, the manoeuvring member may be displaced into a position of misuse in the second direction over at least one second predetermined angular path, without displacing the control members, said manoeuvring member being returned to the neutral position by said dual-action return device in the first direction. As a result, the manoeuvring member may be displaced in a direction opposing the actuating direction without causing damage to the manoeuvring member or the articulations.

In various embodiments of the articulation system according to the invention, it is possible to use one and/or the other of the following arrangements:
the second predetermined angular path is at least 15 degrees; as a result of which if a user inadvertently exerts a force downwards on the manoeuvring member, the handle may move away so as to prevent any damage to the manoeuvring member and/or the mechanism;
the dual-action return device comprises a first helical spring having two end tabs and a guide hub in which the manoeuvring member is received substantially without clearance, said guide hub comprising opposing stops on which said end tabs rest; as a result of which the first helical spring is held perfectly in position;
the dual-action return device is integrated in the first articulation and is located between the two fittings; as a result of which the solution is very compact and its space requirement reduced;
the manoeuvring member comprises a drive bar and at least one manoeuvring handle fixed to the end of said drive bar; as a result of which the manoeuvring member is very easy to manufacture,
the control members each comprise a central recess capable of receiving the drive bar with an angular clearance in the first direction between the neutral position and the initial actuating position by at least 1 degree,
the return member and the dual-action return device are coaxially arranged between the fittings and one inside the other; as a result of which the axial compactness of the articulation is improved;
the system comprises a closing part comprising an annular housing capable of receiving the return member and a central housing capable of receiving the guide hub; as a result of which the return member and the guide hub comprising the dual-action return device are correctly maintained in the articulation;
the system further comprises a second dual-action return device arranged in the second articulation; as a result of which the return force is increased and is present on each side of the articulation system, such that a second manoeuvring handle may be installed at the opposing end of the drive bar.

Moreover, the subject of the invention is also a vehicle seat comprising a seat base and a backrest pivotably mounted relative to the seat base by means of an articulation system as defined above.

BRIEF DESCRIPTION OF THE DRAWINGS

Further features and advantages of the invention will be revealed from the following description of one of the embodiments thereof, given by way of non-limiting example, with reference to the accompanying drawings, in which.

In the various figures, the same reference numerals denote identical or similar elements.

DETAILED DESCRIPTION OF THE DISCLOSURE

Figure 1:
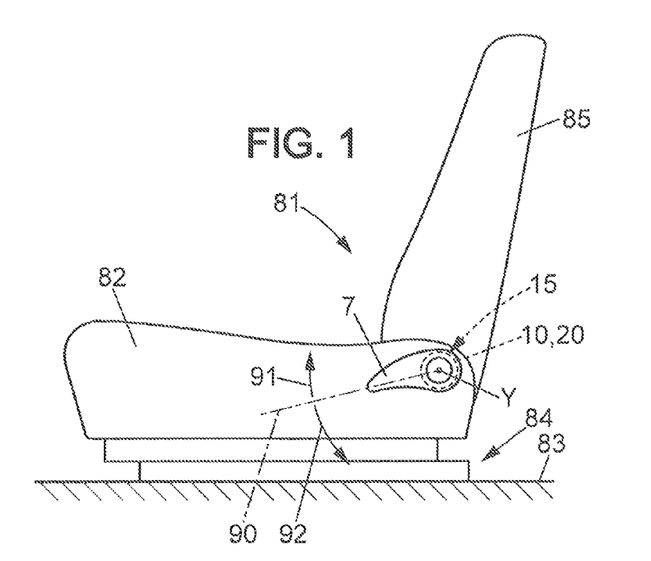
FIG. 1 shows a vehicle seat able to be equipped with an articulation system according to an embodiment of the invention.

FIG. 1 shows a vehicle seat 81, for example a front seat of an automotive vehicle, which comprises a seat base 82 fixed to the floor 83 of the vehicle, for example by means of longitudinal sliders 84, and a backrest 85 pivotably mounted relative to the seat base 82 about a transverse horizontal rotational axis Y by means of an articulation system 15 which is controlled, for example, by a handle 7 or further manoeuvring element.

The handle 7 has a neutral position 90, the so-called "rest position", in which the handle is located in the absence of external force. The handle 7 may be displaced in a first direction 91, also known as the actuating direction for unlocking the articulation system 15, and in a second direction 92, also known as the "misuse" direction, of which the function will be explained below.

Figure 2:
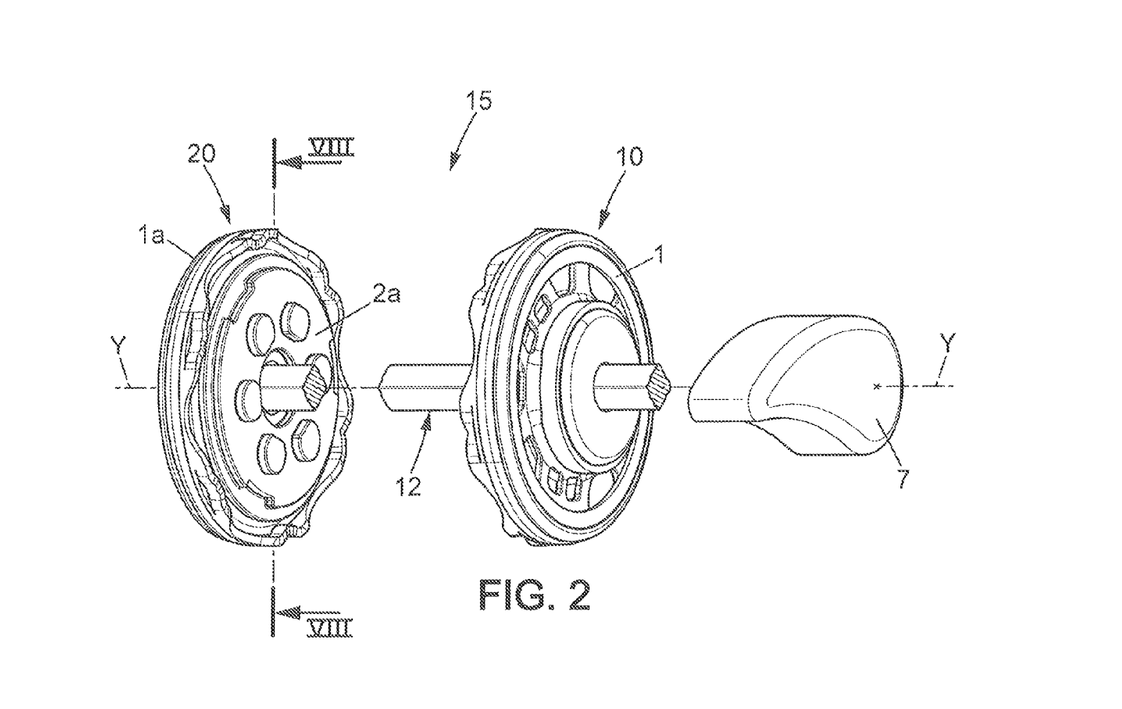
FIG. 2 shows the articulation system of the seat of FIG. 1.
Figure 3:
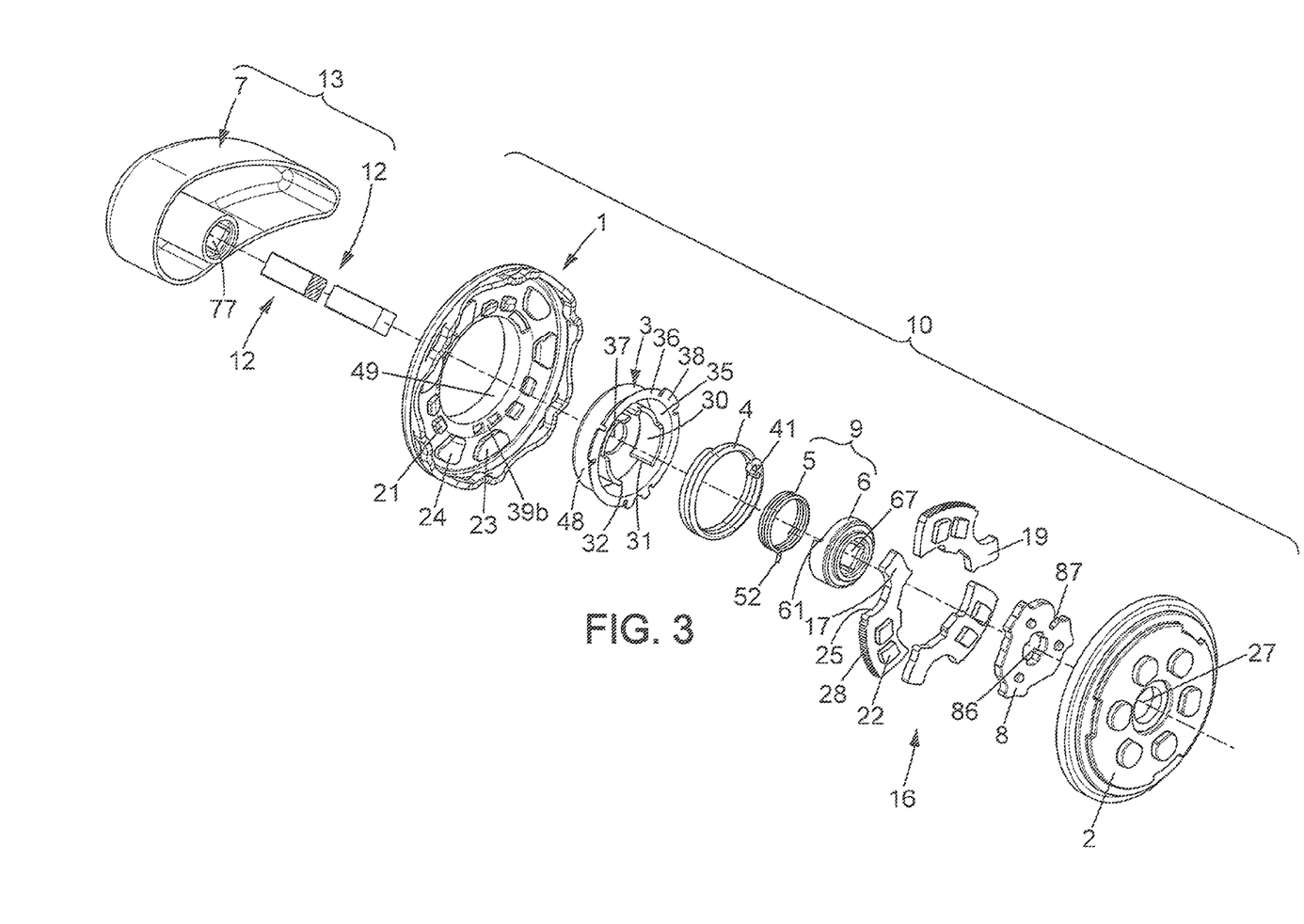
FIG. 3 shows an exploded view in perspective of the articulation system of the seat of FIG. 1, FIGS. 4 and 5 are cross-sectional views of the first articulation, respectively along the cutting lines IV-IV and V-V of FIG. 9, respectively in the unlocked position and the locked position.
Figure 4:
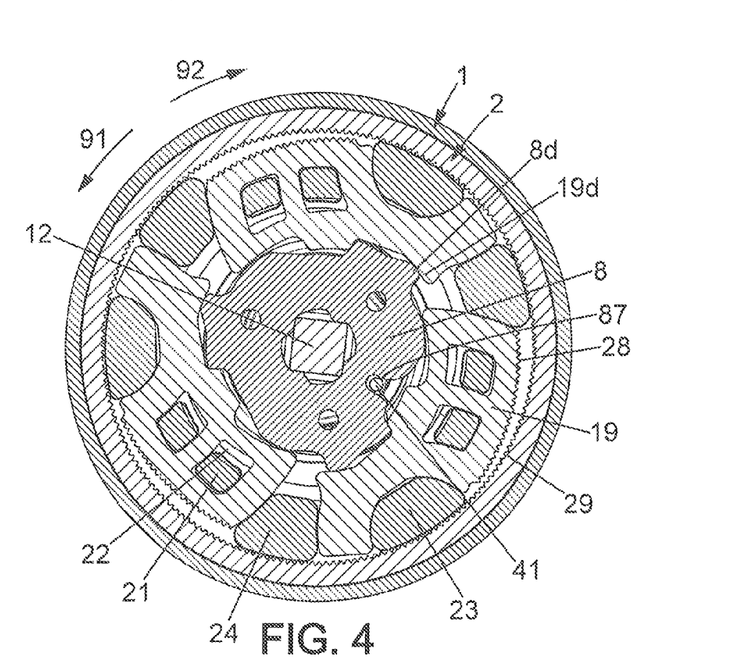
Figure 5:
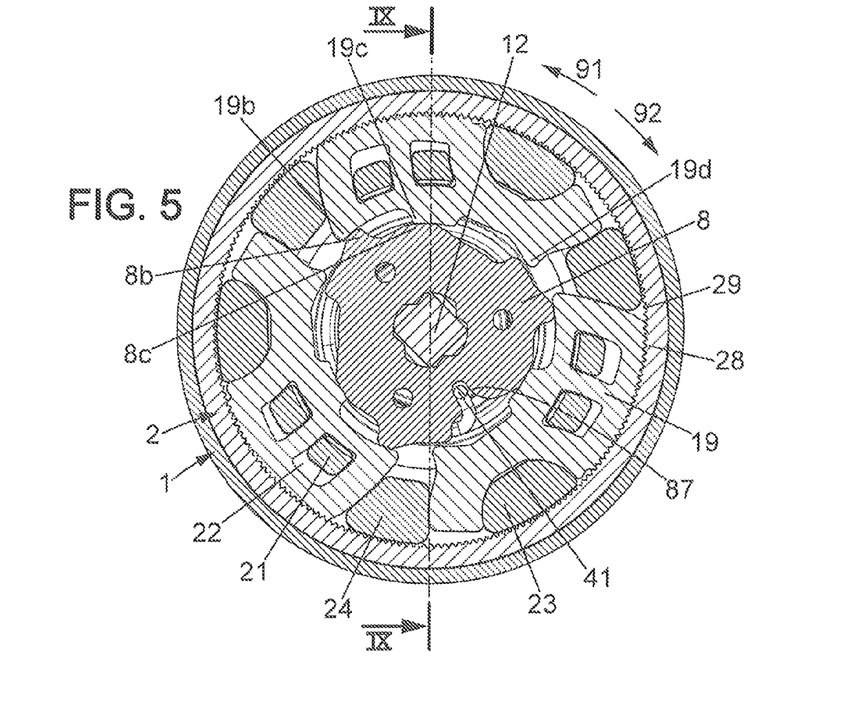

As shown in FIGS. 2 and 3, the articulation system 15 of the seat comprises first and second articulations 10, 20 symmetrical to one another, and which normally immobilize the backrest 85 relative to the seat base 82 as long as the handle 7 is in the neutral position 90 visible in FIGS. 1 and 2, and which may be unlocked simultaneously by pivoting the handle 7 in the first direction 91 about the axis Y, as will be explained below.

Each of the articulations 10, 20 comprises two fittings (1, 1a, 2, 2a) which are fixed, one to the seat base 82 and the other to the backrest 85. In the example shown, said two fittings 1, 2 are in the form of metal flanges which extend perpendicularly to the rotational axis Y and which are rotatably mounted relative to one another about the axis Y by mutual engagement in a manner know per se. By convention, in the remainder of the description, the first flange (or first fitting) 1 is denoted as the fixed flange 1, whilst the second flange (or second fitting) 2 is denoted as the mobile flange 2, but the reverse is naturally possible within the scope of the present invention.

The articulation system 15 of the seat also comprises a manoeuvring member 13 for controlling the unlocking of the articulation system 15.

The manoeuvring member 13 comprises a drive bar 12 extending between the first articulation 10 and the second articulation 20 and at least one manoeuvring handle 7 fixed to one end of said drive bar 12. The manoeuvring handle 7 is preferably made of plastics material and comprises a housing 77 capable of receiving one end of the drive bar 12. In the illustrated example, the drive bar 12 is of square and solid section and may be produced in rigid plastics material, aluminium alloy or any other light metal alloy. The housing 77 of the handle has a complementary square section and may comprise an axial retaining means such as a clip, a circlip or any other fixing means. As a variant, the handle 7 and the drive bar 12 could be obtained by one and the same piece.

A second manoeuvring handle may be mounted at the opposing end of the drive bar 12, as a result of which the control of the unlocking process may be available on each side of the seat.

Between the two fittings 1, 2 is arranged a locking mechanism 16, visible in particular in FIGS. 3, 4, 5 and 9 and which is contained in the housing formed by the flanges 1, 2 and which is capable of immobilizing the mobile flange 2 relative to the corresponding fixed flange as long as the manoeuvring member 13 is not actuated. Said locking mechanism 16 comprises:

three metal locking members 19 which are arranged at 120 degrees relative to one another and which each have an external toothed portion 28 capable of coming into engagement with an internal circular toothed portion 29 centred on the axis Y and formed in the mobile fitting 2, each of said locking members having a rounded housing 25 receiving a core 23 of corresponding semi-circular shape, made in the fixed flange 1, each of said locking members being pivotably mounted about the core 23 so that the locking members are displaceable between, on the one hand, a position of engagement (see FIG. 5) where the toothed portion of said locking members 28 is in engagement with the toothed portion 29 of the corresponding mobile flange to immobilize the articulation and, on the other hand, a retracted position (see FIG. 4) where the locking members 19 do not cooperate with the toothed portion 29 of the mobile fitting 2 and where the locking members are moved away to a maximum extent from the toothed portion 29; each locking member 19 further comprises two hollow shapes 22 in which are received guide pins 21 protruding from the fixed fitting 1, each locking member 19 also having a foot 17 guided between the aforementioned core 23 and a guide 24 of trapezoidal shape protruding from the fixed flange 1, a control member consisting of a metal cam 8 which is rotatably mounted about the axis Y and which is controlled by the drive bar 12, said cam 8 controlling the pivoting of the locking members 19 due to protuberances 8b, 8c, 8d which cooperate with corresponding shapes 19b, 19c, 19d made on the locking members 19, on the one hand so-called unlocking protuberances 8d, which act on the opposing protuberances 19d, pushing them back to the outside when the cam rotates in the first direction 91 to pivot the locking member 19 and move the toothed portion 28 away from the toothed portion 29 (see FIG. 4), and on the other hand so-called locking protuberances 8b which act on the opposing protuberance 19b, pushing it back to the outside when the cam 8 rotates in the second direction 92 to pivot the locking member 19 in the opposing direction and to bring the two toothed portions 28, 29 into engagement (see FIG. 5), a spring 4 forming a return member 4 which is fixed relative to the fixed fitting 1 as will be detailed below and which urges the cam 8 into the locked position where said cam positions the locking members 19 in their position of engagement.

Moreover, the control member 8 comprises a central opening 86 in the general shape of a star with four arms, or in other words a cross, and a notch 87 to fix one end of the spring 4 as will be seen below.

Moreover, the fixed fitting 1 comprises an axial recess 49 of cylindrical shape in which a generally pan-shaped closing part 3 is housed. Said closing part 3 is preferably produced in plastics material and comprises:

- a cylindrical wall 48 with the axis Y received without radial clearance in the aforementioned axial recess 49,
- a base 96 extending perpendicular to the axis Y perforated by an axial hole 37,
- an edge 36 extending radially from the cylindrical wall 48 forming an axial stop relative to the fixed fitting 1 and
- lugs 38, 39 also extending radially from the cylindrical wall 48, with a double lug 39 of complementary shape 39b made in the fixed fitting 1 to immobilize the closing part 3 in rotation relative to the fixed fitting 1 about the axis Y.

Said closing part 3 comprises internally a wall 30 of generally cylindrical shape which separates an annular housing 35 capable of receiving the spring 4 forming the return member 4 and a central housing 88 capable of receiving a guide hub 6 of which the function will be detailed below.

Figure 6:
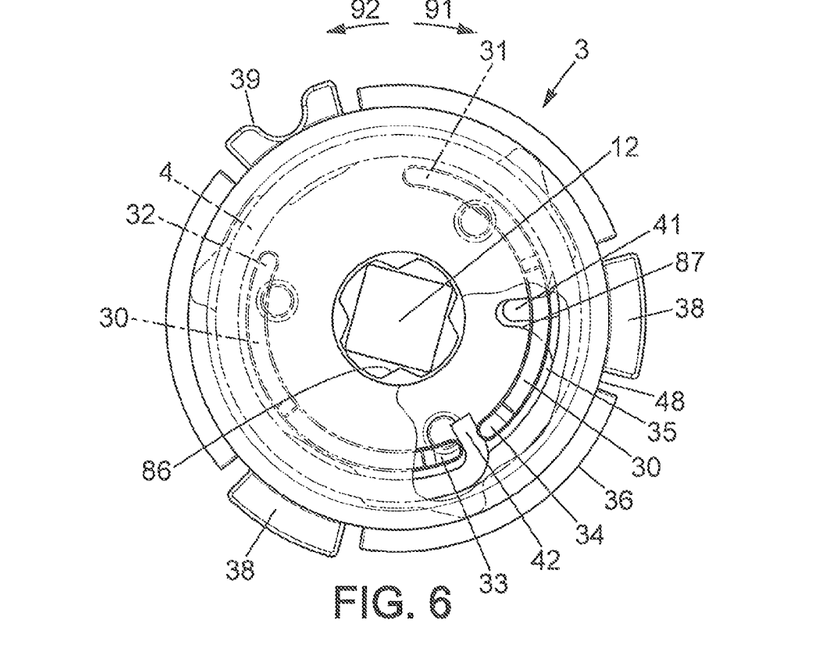
FIG. 6 is a partial view of the first articulation, showing the return member of the cam.

As shown in FIG. 6, the wall 30 comprises a first slot defined by first circumferential stops 33, 34 capable of receiving substantially without clearance a first end 42 of the spring 4 in said first slot and a second slot, which is wider, defined by second circumferential stops 31, 32 of which the function will be detailed below. The second end 41 of the spring 4 is received in the aforementioned notch 87 of the control member 8.

When the control member 8 is displaced into the unlocked position in the direction 91, the second end 41 is driven by the notch 87 and the first end 42 remains in the fixed position in the closing part 3, being immobilized in the first slot. The spring is thus tensioned and returns the control member 8 into the locked position in the second direction 92.

A similar spring exists having the same function in the second articulation 20.

Advantageously according to the invention, the manoeuvring member 13 is returned to a neutral position (also known as the "rest position") 90 by a dual-action return device 9.

Said dual-action return device 9 comprises the aforementioned guide hub 6 and a helical spring 5, having a cylindrical spiral body and first and second ends 51, 52 protruding radially to the outside from the cylindrical spiral body. The first end 51 rests on one of the second circumferential stops 31 and the second end 52 rests on the other of the second aforementioned circumferential stops 32, as is visible in particular in FIG. 7.

Figure 7:
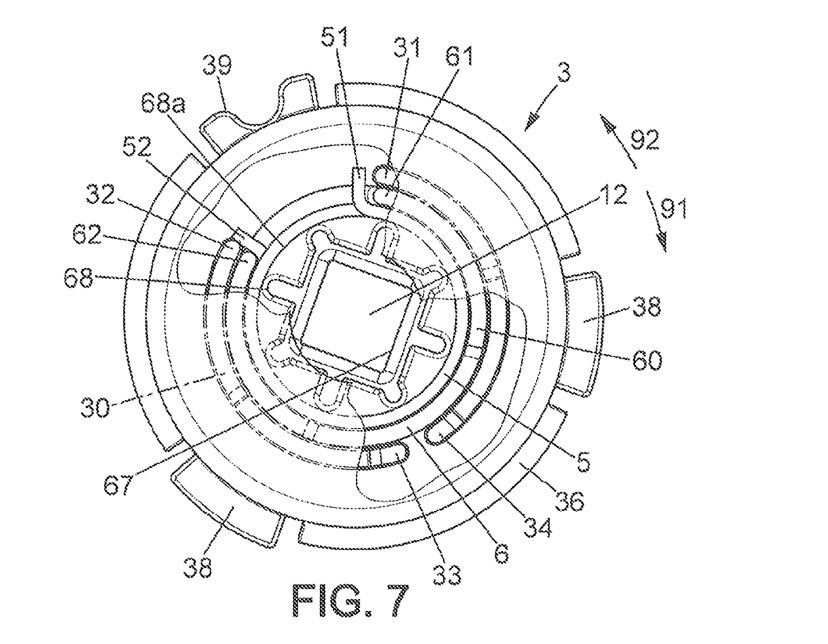
FIG. 7 is a partial view of the first articulation, showing the dual-action return device of the manoeuvring member.

The guide hub 6 is an annular part made of plastics material; the guide hub comprises a central recess 67 of square section in which the drive bar 12 is received substantially without clearance, a star-shaped ring 68 defining an internal cylinder 68a to receive the spring 5, and a peripheral annular wall 60 defining an external cylinder to receive the spring 5.

Thus the spring 5 is received inside an annular volume 66 arranged between the peripheral annular wall 60 and the internal cylinder 68a. The peripheral annular wall 60 comprises a recess defined by the first of the second circumferential stops 61, 62, said recess being arranged to receive the radial ends 51, 52 of the spring 5.

The drive bar 12 passes through the first articulation 10, successively through a central opening 27 made in the second fitting 2, through the central opening 86 of the cam 8, through the central recess 67 of the guide hub 6, through the springs 4 and 5, and finally through the axial hole 37 of the closing part 3.

When the drive bar 12 rotates in the first direction 91, the guide hub 6 is driven in rotation and the stop 62 pushes the second end 52, thus compressing the spring 5. More specifically, the first end 51 remains fixed against the stop 31 of the wall 30 (immobile relative to the fixed flange 1); as the two ends 51, 52 of the spring are brought together, the spring 5 is compressed and thus returns the guide hub 6 towards the neutral position corresponding to the neutral position of the drive bar 12, a position which is shown in FIG. 7.

In a similar manner, when the drive bar 12 rotates in the second direction 92, the guide hub 6 is driven in rotation and the stop 61 pushes the first end 51, thus compressing the spring 5. More specifically, the second end 52 thus remains fixed against the stop 32 of the wall 30; as the spring 5 is compressed, it returns the guide hub 6 into the aforementioned neutral position, in the first direction. Thus a dual-action return mechanism is obtained which returns the bar.

Figure 8:
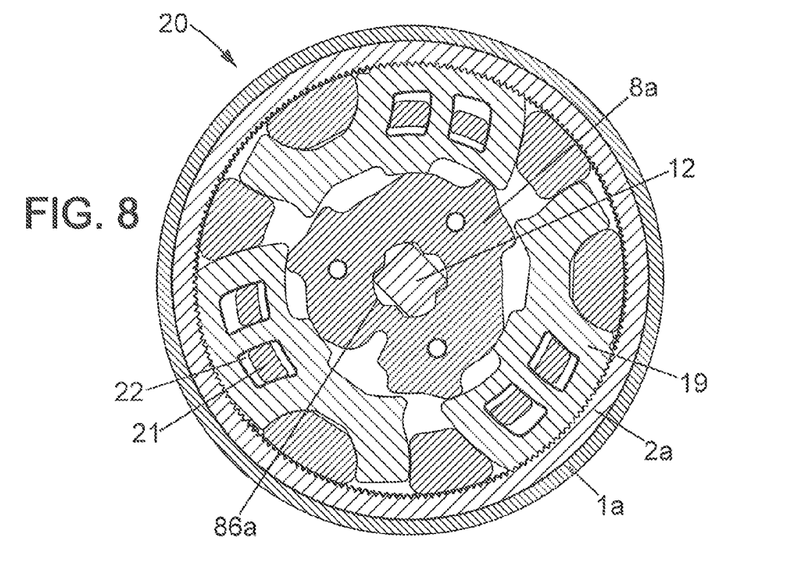
FIG. 8 is a cross-sectional view of the second articulation, along the cutting line VIII-VIII of FIG. 2.
Figure 9:
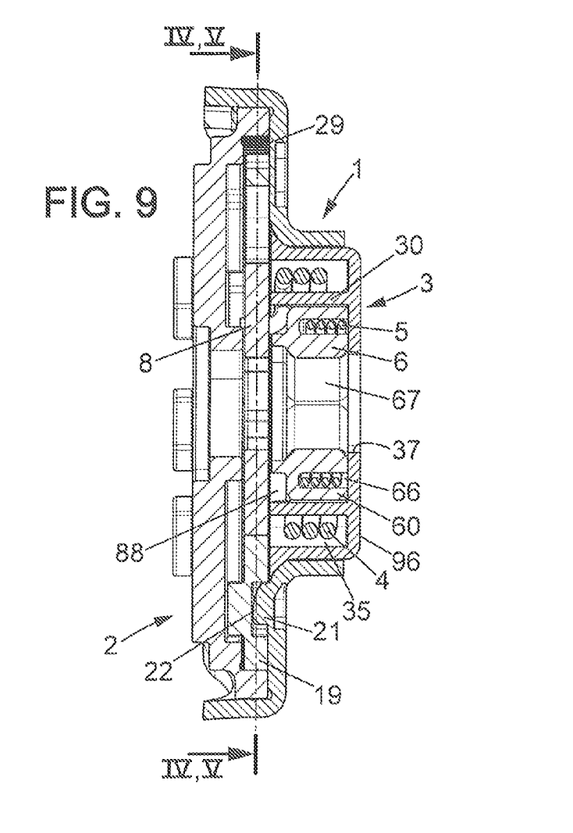
FIG. 9 is a view in partial axial section of the first articulation along the cutting line IX-IX of FIG. 5, and FIGS. 10a-10c are diagrams showing the different positions of the drive bar.

The second articulation 20 illustrated in FIG. 8 is similar to the first; the fittings 1a, 2a and the locking mechanism 16 are symmetrical to the same elements of the first articulation 10 relative to a plane perpendicular to the axis Y.

Whilst not imperative, the second articulation 20 may comprise a second dual-action return device (not shown). The control member 8a of the second articulation 20 comprises a central opening 86a in the general shape of a star with four arms, similar or identical to that already described.

Figure 10A:
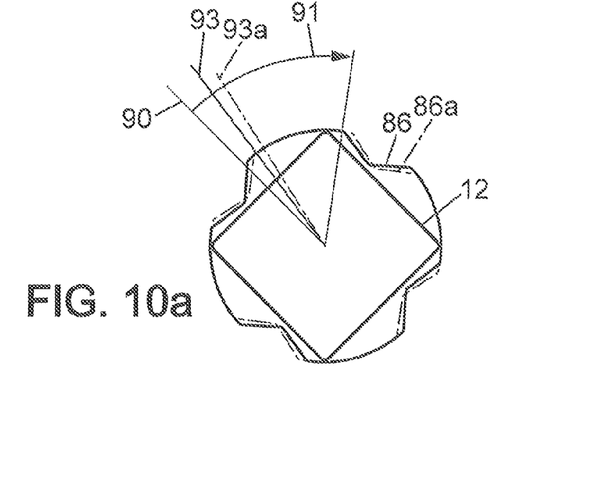

The operation of the articulation system will now be described, in particular in conjunction with FIGS. 10a, 10b, 10c.

As long as the manoeuvring member 13 is not actuated, the dual-action return device 9 holds it in the neutral position 90 as a result of the action of the spring 5 on the guide hub 6. The drive bar 12 is thus not in contact with the cams 8, 8a, in particular there is no contact between the surface 94 of the bar and the internal surface of the cross-shaped recesses 86, 86a: more specifically an angular clearance of at least 1 degree is provided between the rest position of the cam 8 of the first articulation 10 and the drive bar 12. Similarly, an angular clearance of at least 1 degree is provided between the rest position of the cam 8a of the second articulation 20 and the drive bar 12, as illustrated in FIG. 10a.

For reasons of clarity, said angular clearance has been deliberately increased in the drawings.

In practice, a clearance of 2 to 3 degrees is selected as a nominal value, given that the rest positions of the two cams 8, 8a may be slightly offset at an angle as a function of the different manufacturing and mounting procedures.

When the user actuates the manoeuvring member 13 in the first direction 91, the drive bar 12 comes to bear against the control members 8, 8a after at least one first predetermined angular path from the neutral position, and in angular positions 93, 93a offset at an angle by at least one degree, preferably 2 to 3 degrees relative to the neutral position. In this first portion of the angular path, only the dual-action return device 9 returns the manoeuvring member 13 in the second direction 92 towards the neutral position 90.

Figure 10B:
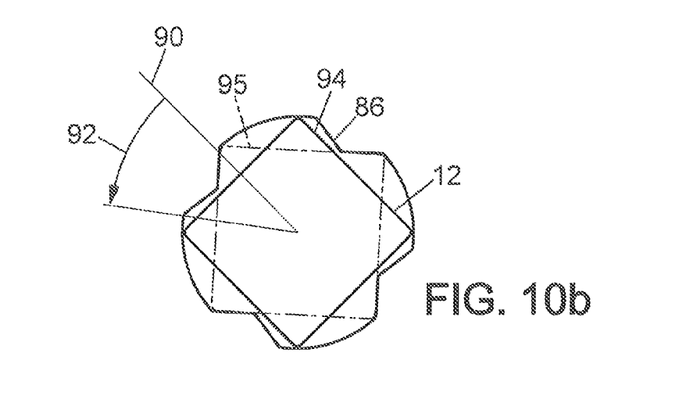
Figure 10C:
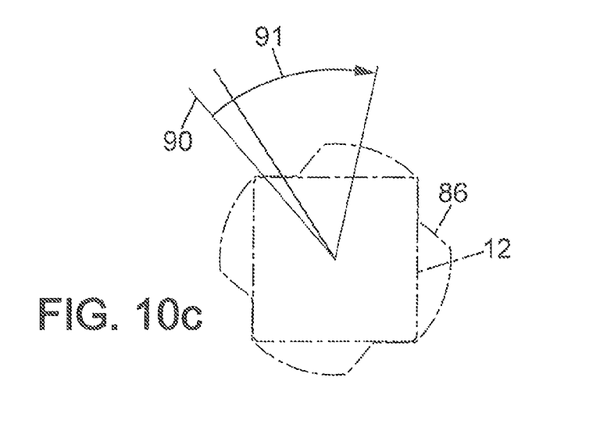

Then, the rotation of the drive bar 12 continues by driving the control members 8, 8a in the direction 91, as illustrated in FIG. 10c, thus causing the unlocking of each articulation 10, 20. In said second portion of the path, the drive bar 12 is returned to the neutral position by the springs 4 returning the cams 8, 8a and by the spring 5 of the dual-action return device 9.

When the user relaxes or completely releases the force, the springs 4 and 5 return the drive bar 12 to the neutral position and the control members (8, 8a) are thus relocked.

When the user actuates the manoeuvring member 13 in the second direction 92, usually inadvertently, the drive bar 12 may be displaced at an angle into a so-called misuse position 95 in the second direction 92, over at least one second predetermined angular path, without displacing the control members (8, 8a), as illustrated in FIG. 10b. Advantageously, said second predetermined path is at least 15 degrees.

The drive bar 12 and, as a result, the manoeuvring member 13 are returned to the neutral position by said dual-action return device 9 in the first direction 91, as has been explained above via the guide hub 6 and the spring 5. Advantageously, the neutral position of the manoeuvring member 13 is defined independently of the return of the control members 8, 8a. Moreover, the articulation system permits a displacement in the direction opposing the normal actuating direction whilst protecting the articulations 10, 20 and the manoeuvring member 13 from damage.

It should be mentioned that, without departing from the scope of the present invention, the locking members 19 could be displaced in translation (translatory locking members) instead of the displacement by rotation as disclosed above.

The invention claimed is:

1. An articulation system comprising:
   first and second articulations, each comprising two fittings which are pivotable relative to one another and a locking mechanism which comprises at least one control member which is mobile between a locked position and an unlocked position, the locking mechanism being capable of locking the two fittings when the control member is in the locked position and unlocking the two fittings when the control member is in the unlocked position, the control members of the two articulations being mobile independently of one another between the locked and unlocked positions and each being urged in a resilient manner into the locked position by a return member arranged between the fittings;
   a manoeuvring member which is mobile in rotation between a neutral position and an actuating position capable of displacing the control members of the first and second articulations from the locked position to the unlocked position when said manoeuvring member is displaced in a first direction from the neutral position to the actuating position, wherein the manoeuvring member is capable of coming to bear against both control members after at least one first predetermined angular path from the neutral position in the first direction, and wherein said manoeuvring member is returned to the neutral position by a manoeuvring member return device in a second direction opposing the first direction, so that the manoeuvring member is angularly spaced from both control members, said manoeuvring member return device being arranged in at least one of the two articulations.

2. The system according to claim 1, wherein said manoeuvring member return device is a dual effect return member, wherein the manoeuvring member may be displaced into a position of misuse in the second direction over at least one second predetermined angular path, without displacing the control members, said manoeuvring member being returned to the neutral position by said dual-action return device in the first direction.

3. The system according to claim 2, in which the second predetermined angular path is at least 15 degrees.

4. The system according to claim 2, in which the dual-action return device comprises a first helical spring having two end tabs and a guide hub in which the manoeuvring member is received substantially without clearance, said guide hub comprising opposing stops on which said end tabs rest.

5. The system according to claim 2, in which the dual-action return device is integrated in the first articulation and is located between the two fittings.

6. The system according to claim 2, in which the return member and the dual-action return device are coaxially arranged between the fittings and one inside the other.

7. The system according to claim 2, further comprising a second dual-action manoeuvring member return device arranged in the second articulation.

8. The system according to claim 1, in which the manoeuvring member comprises a drive bar and at least one manoeuvring handle fixed to the end of said drive bar.

9. The system according to claim 8, in which the control members each comprise a central recess capable of receiving the drive bar with an angular clearance in the first direction between the neutral position and an initial actuating position by at least 1 degree.

10. The system according to claim 1, comprising a closing part comprising an annular housing capable of receiving the return member and a central housing capable of receiving the guide hub.

11. A seat comprising an articulation system according to claim 1.

* * * * *